United States Patent Office 3,591,680
Patented July 6, 1971

3,591,680
CONCENTRATED ANTACID COMPOSITIONS AND METHOD OF PRODUCING ANTACID ACTIVITY
Leon C. Greene, Moorestown, N.J., and Allen Misher, Broomall, and William E. Smith, Fort Washington, Pa., assignors to Smith Kline & French Laboratories, Philadelphia, Pa.
No Drawing. Continuation-in-part of abandoned application Ser. No. 566,749, July 21, 1966. This application Nov. 17, 1969, Ser. No. 877,476
Int. Cl. A61k *27/00*
U.S. Cl. 424—156
10 Claims

ABSTRACT OF THE DISCLOSURE

Aqueous pharmaceutical suspensions containing a high concentration of antacid and a method of producing an increased degree of protection and duration of antacid and anti-ulcer activity by orally administering said suspensions.

---

This application is a continuation-in-part of copending Ser. No. 566,749, filed July 21, 1966 and now abandoned.

This invention relates to antacid pharmaceutical compositions and to a method of producing antacid activity using said compositions. More specifically this invention relates to aqueous pharmaceutical suspensions or magmas having antacid and anti-ulcer prpoerties which contain a high concentration of the active component.

Therapeutically antacids are used for the treatment of gastric hyperacidity, dyspepsia and peptic ulcers. Antacids have played a major role in the management of peptic ulcers and in appropriate doses do relieve the pain.

It has been reported that aqueous suspensions or magmas of a given substance react more rapidly and more completely than dried preparations of the same substance. One of the major disadvantages of currently available antacid magmas is that they contain only about 8% antacid. Due to this low concentration the commercially available antacid suspensions possess a very short duration of action. These antacid products have an effective duration which is reported by medical experts to be from about 20 to about 40 minutes. The present commercial antacids are also rapidly and readily eliminated from the stomach as it empties and it has been demonstrated that a sufficient amount of antacid no longer remains after 30 minutes to provide adequate antacid or anti-ulcer activity.

In an attempt to overcome this short duration of action of previous antacid commercial products and to obtain an adequate and sustained effect, modern therapy comprises administering the antacid at intervals of no longer than one hour. Even when the antacid is administered within these frequent hourly intervals the desired therapeutic effect, maintenance of gastric pH about 3.5, is frequently lost between doses. Further, this method of administration would make it difficult to adequately control the gastric acidity during the sleeping hours of the subject.

It is also apparent that this method of therapy, particularly for peptic ulcers, involves the oral administration of large daily volumes of antacid to keep the gastric contents neutralized. The administration of larger volumes of the commercial liquid antacid suspensions per dose has proven very impractical for several reasons. Most important, it has been demonstrated that increasing the volume of the suspension does not increase the duration of action and produces substantially the same therapeutic effect. Secondly, increasing the volume of antacid per dose would result in a serious personal discomfort and expense.

Other disadvantages associated with the current antacids is that many of them do not have the degree of neutralization activity necessary to neutralize the acid promptly nor do they reach this neutralization potential during their short stay in the stomach.

A further disadvantage is that commercially available antacid products also have recognized stability problems. One of these is their tendency to coagulate and clump upon standing. This characteristic is particularly evident when the products are allowed to freeze and eventually thaw. The freezing produces a change of particle structure which in turn results in a dense precipitate or flocculation. Upon thawing a clear water stratum separates on top of the bottle and the product cannot be readily redispersed upon shaking. Consequently, this makes the product unfit for further use. It is because of this very poor stability with freezing temperatures that the United States Pharmacopoeia cautions "avoid freezing" and the commercial labeling requires "do not freeze" warnings on present commercial products.

It is therefore the object of this invention to prepare concentrated forms of liquid antacid suspensions which are palatable and pharmaceutically stable and also to provide, in using these concentrated preparations, for a method of producing prompt and longer acting antacid and anti-ulcer activity, i.e., antacid and ulcer protection well beyond the normal gastric emptying time and of sufficient duration of effective activity to maintain the gastric contents at a desirable pH between doses.

The first aspect of this invention provides for a much more concentrated form of aqueous antacid suspension than has been previously available. It further provides a more convenient, stable and acceptable liquid for antacid, ulcer therapy which has unexpectedly resulted in a novel method of producing a higher degree of protection and duration of action of the antacid.

The preparation in accordance with this invention can contain as high as 50% antacid which represents more than a five fold increase in concentration over the commercially available magmas of the prior art which contain about 8% antacid. The novel pharmaceutical preparation of this invention is unique in that it is not only much more concentrated than the commercially available antacid but it is pharmaceutically elegant being more stable and palatable. The aqueous suspension as disclosed hereinafter can be frozen and then redispersed after thawing without any difficulty. Furthermore, the antacid suspension of this invention has improved palatability and is free of the earthy, gritty, astringent, chalky taste which is so prevalent even with the less concentrated antacid compositions of the art.

The novel pharmaceutical composition of this invention comprises an aqueous suspension comprising a high concentration of antacid and a nonionic water soluble cellulose ether. It has been unexpectedly discovered that the use of a hydroxypropyl cellulose ether allows for a much higher concentration of antacid in an aqueous suspension than has previously been known. The employment of the hydroxypropyl cellulose has the further added advantage in that it not only produces an aqueous suspension of an antacid having a high concentration but it also provides for a palatable and stable preparation. The hydroxypropyl cellulose prevents the antacid from clumping or caking at the bottom of the container thus insuring proper dosage by simple shaking before use.

By the term high concentration is meant that the antacid ingredient is present up to about 50% weight/volume. Preferably the antacid is present from about 25% to about 50% weight/volume, most advantageously from about 30% to about 45% weight/volume.

The antacid employed may be any of the conventional antacids well known to the art. For example, the antacid may be calcium carbonate, magnesium oxide, magnesium trisilicate, magnesium carbonate, aluminum hydroxide, bismuth aluminate, aluminum oxyhydroxide, sodium bicarbonate, magnesium hydroxide, sodium carbonate and aluminum phosphate or combinations thereof such as, for example, aluminum hydroxide-magnesium hydroxide glycine dried gel, aluminum hydroxide-magnesium carbonate co-dried gel and aluminum hydroxide-glycine dried gel.

The hydroxypropyl cellulose employed is a nonionic, water soluble ether. Preferably the compounds of this series will be cellulose ethers which contain on an anhydrous basis, not more than 4.6 hydroxypropyl groups per anhydroglucose unit and have a minimum viscosity of 75 centipoises for 5% by weight aqueous solution at 25° C. One example of the hydroxypropyl celluose is the product marketed under the trade name of "Klucel" by the Hercules Powder Company. The hydroxypropyl cellulose is present in an amount of from about 0.1% to about 2.0% by weight. Preferably the cellulose derivative is present from about 0.5% to about 1.0% by weight.

When the novel concentrated aqueous antacid suspensions described above were tested, it was unexpectedly discovered that they had novel pharmacological properties as well as the pharmaceutical advantages noted. For example, the suspensions of this invention also proved unique in that they not only promptly neutralized gastric acidity but further produced an increase in both the degree of protection and duration of action of the antacid. When equal volumes of the antacid preparation of this invention and the leading commercial antacid of the prior art were administered orally, it was demonstrated that the preparation of this invention had a higher degree of anti-ulcer activity over a longer period of time. At the end of the first hour the commercial product completely lost its anti-ulcer activity while the pharmaceutical preparation of this invention still offered a high degree of protection against ulcers. In contrast to the commercial products which show no anti-ulcer activity, approximately 40 minutes after a single dose is administered, the products of this invention still demonstrate anti-ulcer activity two hours after an equal volume is administered. Consequently the pharmaceutical preparations of this invention assure more complete protection against ulcers between doses whereas the presently available products do not possess this advantage.

The novel pharmaceutical compositions of this invention have therefore led to a corollary invention, a new method of treating subjects suffering from gastric hyperacidity by administering highly concentrated aqueous antacid suspensions. This novel method not only produces an increase in the degree of protection and duration of action of the antacid, but has a further advantage in that it is both more convenient and economical than present antacid therapy. Due to the high concentration of the aqueous suspension, the necessity of administering large daily volumes of antacid to obtain and maintain a therapeutic effect between doses is now eliminated. In order to obtain the desired therapeutic single dose of antacid as defined hereinafter, the patient must take from 7 to 25 teaspoonfuls of the commercial antacid suspension as compared to only 2 to 4 teaspoonfuls of the concentrated antacid suspension using the methods of this invention. In effect, this new method of antacid and anti-ulcer treatment gives enhanced activity with preparations that can be injected by the patient more easily and pleasantly than the prior art preparations.

The method in accordance with this invention comprises administering orally to human subjects who suffer from gastric hyperacidity or other similar gastrointestinal abnormalities, such as, for example, peptic ulcers, a nontoxic therapeutic dose of a concentrated aqueous antacid suspension comprising from about 25% to about 50% weight/volume of antacid and a suspending agent. The suspending agent is preferably present in an amount of from about 0.1% to about 2.0% and may be any well known to the art, such as, for example, tragacanth, acacia, cellulosic derivatives such as, for example, methyl cellulose, carboxymethylcellulose and sodium carboxy methylcellulose, colloidal magnesium aluminum silicate (Veegum), sodium alginate, carboxypolymethylene (Carbopol), submicroscopic silica (Cab-o-Sil), guar gum, locust gum, carrageenin, and hydroxypropyl methylcellulose or combinations thereof.

In addition certain stabilizers such as sorbitol or salts such as, for example, calcium phosphate monobasic combined with a pharmaceutically acceptable nontoxic alkali earth or alkali metal gluconate such as sodium, potassium, magnesium calcium gluconate may be used in the concentrated antacid suspensions to aid stability.

A preferred species of such a concentrated suspension to be administered is the class of hydroxypropyl cellulose preparations described herein which are fluid and pourable for at least two months at room temperature.

The use of the combination of phosphate and gluconate salts as additives to prepare a stable and palatable highly concentrated aqueous antacid suspension is the subject matter of a corollary pending application owned by same assignee having Ser. No. 719,234 and filed Apr. 5, 1968, reference to which, under Rule 79, is hereby placed on record.

Preferably the nontoxic therapeutic single dose will be from about two to four teaspoonfuls of the concentrated aqueous suspension and will contain from about 2.5 gms. to about 10.0 gms. of the antacid. Preferably the nontoxic therapeutic dose will be administered from two to four times daily resulting in a daily dosage of from about 5.0 gms. to about 40.0 gms. of antacid. Most advantageously the daily dosage will be from about 12.0 to about 32.0 gms.

When the method of administration described above is carried out, gastric acidity is promptly neutralized and a more prolonged period of protection than currently available antacid compositions is achieved. This prolonged antacid activity was confirmed when the above method of administering a concentrated antacid suspension using conventional suspending agents was compared with the administration of a leading commercial antacid in clinical tests on 39 patients by three physicians. When equal volumes of the concentrated antacid suspension of this invention and the commercial product were administered, the results clearly indicated that the method of administering the concentrated antacid suspension maintained the gastric pH above 3.5 for approximately twice as long as the commercial antacid. Further, when the commercial antacid was administered a pH of 4.0 was not reached while the method of administering the concentrated antacid resulted in an estimated mean duration of action pH$\geq$4.0 of approximately 93 minutes. The concentrated aqueous antacid suspension employed in these clinical tests contained a mixture of some of the well known suspending agents listed above, such as, for example, methyl cellulose, submicroscopic silica and additives such as calcium gluconate and calcium phosphate.

The above aqueous concentrated antacid suspensions or magmas are made following the techniques described hereafter. When necessary any desired pharmaceutically compatible adjuvant used in liquid preparations by those skilled in the art may be employed. For example, preservatives such as methylparaben, or propylparaben, flavoring agents such as oil of orange, lemon-lime flavors, raspberry flavor, cola flavors, mint flavors or the combination of these flavors or any solubilizing agent such as glycerin or propylene glycol may be employed. Further, antispasmodic agents, tranquilizers or other medicaments can be optionally included in the preparation.

The invention will be further clarified by the following specific examples. These examples are not limiting but are used to make obvious to one skilled in the art the full practice of the method of this invention.

EXAMPLE 1

Ingredients: Amount
- Calcium carbonate, precipitated, U.S.P. gms__ 11.5
- Magnesium hydroxide, N.F. gms__ 25.0
- Hydroxypropyl cellulose gms__ 0.5
- Methylparaben, U.S.P. gms__ 0.05
- Propylparaben, U.S.P. gms__ 0.01
- Glycerin, U.S.P. ml__ 5.00
- Lemon-lime flavor ml__ 0.05
- Raspberry flavor ml__ 0.05
- Purified water, U.S.P. q.s. ad ml__ 100.00

The hydroxypropyl cellulose is dissolved in about 65 ml. of water. The calcium carbonate and magnesium hydroxide are evenly suspended in the hydroxypropyl cellulose solution. The parabens are then dissolved in the glycerin with the aid of heat and added to the suspension. The flavors are then added and the suspension is brought to the desired volume by the addition of sufficient water.

Four teaspoonfuls of the suspension are administered four times a day.

EXAMPLE 2

Ingredients: Amount
- Aluminum hydroxide, N.F. gms__ .18.90
- Magnesium hyroxide, N.F. gms__ 11.00
- Precipitated calcium carbonate, U.S.P. gms__ 7.50
- Cetyl dimethyl benzyl ammonium chloride gms__ 0.01
- Glycine gms__ 9.00
- Calcium phosphate monobasic gms__ 3.75
- Calcium gluconate gms__ 2.00
- Hydroxypropyl methylcellulose gms__ 0.12
- Peppermint flavor ml__ 0.10
- Purified water, U.S.P. q.s. ad ml__ 100.00

The cetyl dimethyl benzyl ammonium chloride is dissolved in 65 ml. of water. The aluminum hydroxide, magnesium hydroxide and glycine are evenly suspended in the solution. The calcium gluconate and calcium phosphate monobasic are then added. The calcium carbonate and hydroxypropyl methylcellulose are also added to the suspension with gentle agitation. The flavor is added and the suspension is brought to the desired volume by the addition of sufficient water.

Three teaspoonfuls of the suspension are administered three times a day.

EXAMPLE 3

Ingredients: Amount
- Aluminum hydroxide, N.F. gms__ 13.00
- Magnesium hydroxide, N.F. gms__ 12.00
- Methylparaben, U.S.P. gms__ 0.045
- Propylparaben, U.S.P. gms__ 0.020
- Sodium alginate gms__ 2.50
- Sorbitol solution, U.S.P. ml__ 10.00
- Sodium saccharin, U.S.P. gms__ 0.03
- Sodium succaryl, N.F. gms__ 0.30
- Lemon-lime mint flavor ml__ 0.10
- Purified water, U.S.P. q.s. ad ml__ 100.00

The aluminum hydroxide and magnesiu hydroxide are suspended in 65 ml. of water. The parabens, sodium saccharin, and sodium succaryl are dissolved in a portion of the water with heat and added to the suspension. The flavors and sorbital solution are added and the suspension is brought to the desired volume by the addition of sufficient water.

Two teaspoonfuls of the suspension are administered three times a day.

EXAMPLE 4

Ingredients: Amount
- Magnesium hydroxide-aluminum hydroxide glycine dried gel gms__ 30.00
- Hydroxypropyl cellulose gms__ 0.10
- Sodium saccharin, U.S.P. gms__ 0.03
- Sodium succaryl, N.F. gms__ 0.30
- Methylparaben, U.S.P. gms__ 0.045
- Propylparaben, U.S.P. gms__ 0.020
- Lemon-lime mint flavor ml__ 0.10
- Purified water, U.S.P. q.s. ad ml__ 100.00

The magnesium hydroxide-aluminum hydroxide glycine dried gel is suspended in about 65 ml. of a solution containing the hydroxypropyl cellulose. The parabens, sodium saccharin and sodium succaryl are dissolved in a portion of the water with heat and added to the suspension. The flavors are added and the suspension is brought to the desired volume by the addition of sufficient water.

Two teaspoonfuls of the suspension are administered three times a day.

EXAMPLE 5

Ingridents: Amount
- Aluminum hydroxide-glycine dried gel gms__ 25.00
- Magnesium hydroxide, N.F. gms__ 9.50
- Calcium carbonate, precipitated, U.S.P. gms__ 8.50
- Carboxypolymethyl (Carbopol) gms__ 2.00
- Microscopic silica gms__ 0.15
- Sodium succaryl, N.F. gms__ 0.30
- Methylparaben, U.S.P. gms__ 0.045
- Propylparaben, U.S.P. gms__ 0.020
- Propylene glycol, U.S.P. ml__ 5.00
- Imitation wintergreen ml__ 0.25
- Purified water, U.S.P. q.s. ad ml__ 100.00

The aluminum hydroxide, magnesium hydroxide, and calcium carbonate are suspended in 65 ml. of water containing the carboxypolymethylene and microscopic silica. The parabens and sodium succaryl are dissolved in a portion of the water with heat and added to the suspension. The flavor is added and the suspension brought to the desired volume by the addition of sufficient water.

Two teaspoonfuls of the suspension are administered three times a day.

EXAMPLE 6

Ingredients: Amount
- Aluminum hydroxide, N.F. gms__ 28.00
- Magnesium carbonate, N.F. gms__ 7.00
- Colloidal magnesium aluminum silicate (Veegum) gms__ 1.50
- Cetyl dimethyl benzyl ammonium chloride gms__ 0.01
- Submicroscopic silica gms__ 0.10
- Glycerin, U.S.P. ml__ 8.00
- Peppermint flavor ml__ 0.10
- Purified water, U.S.P. q.s. ad ml__ 100.00

The cetyl dimethyl benzyl ammonium chloride is dissolved in 65 ml. of water. The aluminum hydroxide and magnesium carbonate are evenly suspended in the solution and the colloidal magnesium aluminum silicate, submicroscopic silica and glycerin are added to the suspension with gentle agitation. The flavor is then added and the suspension is brought to the desired volume by the addition of sufficient water.

Three teaspoonfuls of the suspension are administered four times a day.

EXAMPLE 7

Ingredients: Amounts
- Aluminum hydroxide, NF gms__ 14.50
- Calcium carbonate, precipitated, U.S.P. gms__ 13.00
- Glycerin, U.S.P. ml__ 10.00

| Ingredients: | Amount |
| --- | --- |
| Sodium carboxymethylcellulose _____gm__ | 1.00 |
| Submicroscopic silica _____gm__ | 0.500 |
| Methylparaben, U.S.P. _____gm__ | 0.0625 |
| Propylparaben, U.S.P. _____gm__ | 0.0125 |
| Sugar syrup, U.S.P. _____ml__ | 14.00 |
| Imitation cola flavor _____ml__ | 0.10 |
| Soluble lemon-lime flavor _____ml__ | 0.03 |
| Purified water, U.S.P. q.s. ad _____ml__ | 100.00 |

The aluminum hydroxide and calcium carbonate are added to a portion of the water and evenly dispersed. The sugar syrup is then added and mixed. The parabens are dissolved in the glycerin with the aid of heat and the submicroscopic silica and sodium carboxymethylcellulose added to the glycerin solution. The glycerin mixture is then added to the antacid mixture and stirred until evenly dispersed. The flavors are added and the suspension brought to the desired volume by the addition of sufficient water.

Four teaspoonfuls of the suspension are administered twice a day.

EXAMPLE 8

| Ingredients: | Amount |
| --- | --- |
| Calcium carbonate, precipitated, U.S.P. _____gms__ | 15.50 |
| Magnesium hydroxide, N.F. _____gms__ | 10.00 |
| Methylparaben, U.S.P. _____gm__ | 0.045 |
| Propylparaben, U.S.P. _____gm__ | 0.020 |
| Locust gum _____gm__ | 0.50 |
| Sorbitol solution, U.S.P. _____ml__ | 15.00 |
| Propylene glycol _____ml__ | 5.00 |
| Imitation wintergreen _____ml__ | 0.25 |
| Purified water, U.S.P. q.s. ad _____ml__ | 100.00 |

The calcium carbonate and magnesium hydroxide are evenly suspended in 60 ml. of water containing the sorbitol solution and locust gum. The parabens are dissolved in the propylene glycol and added to the suspension. The flavor is added and the suspension brought to the desired volume by the addition of sufficient water.

Three teaspoonfuls of the suspension are administered three times a day.

EXAMPLE 9

| Ingredients: | Amount |
| --- | --- |
| Calcium carbonate, precipitated, U.S.P. _____gms__ | 25.00 |
| Magnesium hydroxide, N.F. _____gms__ | 25.00 |
| Propylene glycol, U.S.P. _____ml__ | 4.00 |
| Methylparaben, U.S.P. _____gm__ | 0.045 |
| Propylparaben, U.S.P. _____gm__ | 0.020 |
| Hydroxypropyl cellulose _____gm__ | 0.100 |
| Lemon-lime flavor _____ml__ | 0.100 |
| Purified water, U.S.P. q.s. ad _____ml__ | 100.00 |

The hydroxypropyl cellulose is dissolved in about 65 ml. of water and the calcium carbonate and magnesium hydroxide are suspended in this solution. The parabens are dissolved in the propylene glycol with the aid of heat and added to the suspension. The flavor is added and the suspension is brought to the desired volume by the addition of sufficient water.

Four teaspoonfuls of the suspension are administered four times a day.

A particularly advantageous example is the following:

| Ingredients: | Amount |
| --- | --- |
| Aluminum hydroxide-magnesium hydroxide glycerine dried gel _____gms__ | 35.00 |
| Calcium carbonate, precipitated, U.S.P. _____gms__ | 7.50 |
| Propylene glycol, U.S.P. _____ml__ | 5.00 |
| Methylparaben, U.S.P. _____gm__ | 0.045 |
| Propylparaben, U.S.P. _____gm__ | 0.020 |
| Hydroxypropyl cellulose _____gm__ | 0.15 |
| Imitation wintergreen _____ml__ | 0.25 |
| Purified water, U.S.P. q.s. ad _____ml__ | 100.00 |

The hydroxypropyl cellulose is dissolved in about 65 ml. of water the aluminum hydroxide-magnesium hydroxide gel and calcium carbonate are suspended in this solution. The parabens are dissolved in the propylene glycol with the aid of heat and added to the suspension. The wintergreen flavor is added and the suspension is brought to the desired volume by the addition of sufficient water.

Four teaspoonfuls of the suspension are administered three times a day.

What is claimed is:

1. A pharmaceutical composition comprising from about 25% to about 50% weight/volume of a solid antacid material, comprising aluminum hydroxide, magnesium hydroxide, calcium carbonate, magnesium oxide, magnesium trisilicate, magnesium carbonate, bismuth subcarbonate, dihydroxy aluminum aminoacetate, bismuth aluminate, aluminum oxyhydroxide, sodium bicarbonate, sodium carbonate, aluminum phosphate, glycine or combinations thereof suspended in an aqueous vehicle containing from about 0.1% to about 2.0% weight/volume of a hydroxypropyl cellulose ether containing on an anhydrous basis not more than 4.6 hydroxypropyl groups per anhydroglucose unit and having a minimum viscosity of 75 centipoises for 5% by weight aqueous solution at 25° C.

2. The pharmaceutical composition of claim 1 wherein an antacid is a combination of aluminum hydroxide-magnesium hydroxide glycine dried gel and calcium carbonate.

3. The pharmaceutical composition of claim 1 wherein the antacid is a combination of calcium carbonate and magnesium hydroxide.

4. The pharmaceutical composition of claim 1 wherein the antacid is a combination of magnesium hydroxide-aluminum hydroxide glycine dried gel.

5. The method of producing improved antacid and anti-ulcer actvity which comprises administering orally in a single dose to a subject suffering from gastric hyperacidity a nontoxic therapeutic quantity of from about 2.5–10.0 grams of an antacid uniformly dispersed in a palatable aqueous suspending medium at a concentration of from about 25% to about 50% weight/volume of said antacid comprising aluminum hydroxide, magnesium hydroxide, calcium carbonate, magnesium oxide, magnesium trisilicate, magnesium carbonate, bismuth subcarbonate, dihydroxy aluminum aminoacetate, bismuth aluminate, aluminum oxyhydroxide, sodium bicarbonate, sodium carbonate, aluminum phosphate, glycine or combinations thereof combined with an effective quantity of a suspending agent comprising methyl cellulose, hydroxypropyl cellulose, hydroxypropyl methyl cellulose, sodium carboxymethylcellulose, sodium alginate, colloidal magnesium aluminum silicate, tragacanth, acacia, carrageenin, microscopic silica, carboxypolymethylene, guar gum, locust gum or combinations thereof, said method producing an increased degree of protection and duration of action of antacid and anti-ulcer activity.

6. The method of claim 5 wherein the single dose is administered from two to four times daily comprising a daily dose of from about 5.0 grams to about 40.0 grams of antacid.

7. The method of claim 5 wherein the antacid is magnesium carbonate, magnesium hydroxide, aluminum hydroxide, calcium carbonate or combinations thereof.

8. The method of claim 5 wherein the antacid is a combination of aluminum hydroxide and magnesium hydroxide.

9. The method of claim 5 wherein the antacid is a combination of aluminum hydroxide-glycine dried gel, magnesium hydroxide and calcium carbonate and the suspending agent is a combination of hydroxypropyl methylcellulose and submicroscopic silica.

10. The method of claim 5 wherein the antacid is a combination of aluminum hydroxide-magnesium hydroxide glycine dried gel and calcium carbonate and the suspending agent is hydroxypropyl cellulose.

References Cited

UNITED STATES PATENTS

| | | | |
|---|---|---|---|
| 3,044,933 | 7/1962 | Cadwallader | 424—158 |
| 3,062,714 | 11/1962 | Pitkin et al. | 424—128 |
| 3,245,876 | 4/1966 | Martin, Jr. | 424—157 |

ALBERT T. MEYERS, Primary Examiner

D. M. STEPHENS, Assistant Examiner

U.S. Cl. X.R.

424—128, 131, 155, 157, 158